United States Patent
Collin et al.

(10) Patent No.: US 11,323,786 B2
(45) Date of Patent: May 3, 2022

(54) GENERAL PURPOSE SINGLE CHIP CONTROLLER

(71) Applicant: Semitech Semiconductor Pty Ltd., Kensington (AU)

(72) Inventors: Zeev Collin, Tustin, CA (US); F. Matthew Rhodes, State College, PA (US)

(*) Notice: Subject to any disclaimer, the term of this patent is extended or adjusted under 35 U.S.C. 154(b) by 854 days.

(21) Appl. No.: 15/428,120

(22) Filed: Feb. 8, 2017

(65) Prior Publication Data
US 2017/0150241 A1 May 25, 2017

Related U.S. Application Data

(63) Continuation-in-part of application No. 14/058,266, filed on Oct. 20, 2013, now Pat. No. 9,602,023.
(Continued)

(51) Int. Cl.
 *H04Q 9/14* (2006.01)
 *H02J 3/38* (2006.01)
 *H02M 7/48* (2007.01)

(52) U.S. Cl.
 CPC .............. *H04Q 9/14* (2013.01); *H02J 3/383* (2013.01); *H02M 7/48* (2013.01);
(Continued)

(58) Field of Classification Search
CPC .. H04Q 9/14; H04Q 2209/30; H04Q 2209/40; H04Q 2209/43; H02J 3/383;
(Continued)

(56) References Cited

U.S. PATENT DOCUMENTS 5,451,923 A * 9/1995 Seberger ............... G08C 19/02
340/12.32
8,106,537 B2 1/2012 Casey
(Continued)

FOREIGN PATENT DOCUMENTS

CN 101873090 A * 10/2010
KR 100321906 B1 * 1/2002
(Continued)

OTHER PUBLICATIONS

International Search Report in PCT/IB2018/000250 dated Jul. 4, 2018.
(Continued)

*Primary Examiner* — Pinping Sun
(74) *Attorney, Agent, or Firm* — Henry J. Cittone; Cittone Demers & Arneri LLP (57) ABSTRACT

The present invention provides a general purpose controller chip that can be used for remotely monitoring and/or controlling plurality of devices that require current and/or voltage adjustment. In an embodiment, the general purpose controller chip is capable of performing multiple algorithmic functions such as monitoring current and voltage, adjusting and controlling them, switching power, performing detection algorithms, such as arc detection, LED dimming and the like, as well as communication functions. The general purpose controller chip provides a significantly higher level of integration and thereby makes the design of the devices simpler and dramatically reduces the cost of implementation, while providing ease of maintenance.

9 Claims, 4 Drawing Sheets

Related U.S. Application Data (60) Provisional application No. 61/716,583, filed on Oct. 21, 2012.

(52) U.S. Cl.
CPC ..... *H04Q 2209/30* (2013.01); *H04Q 2209/40* (2013.01); *H04Q 2209/43* (2013.01); *Y02E 10/56* (2013.01)

(58) Field of Classification Search
CPC ........ H02J 3/381; H02J 2300/24; H02M 7/48; Y02E 10/56
See application file for complete search history.

(56) References Cited

U.S. PATENT DOCUMENTS

| | | | |
|---|---|---|---|
| 8,284,574 B2 | 10/2012 | Chapman | |
| 8,456,865 B1 | 6/2013 | Bianchi | |
| 2002/0128037 A1* | 9/2002 | Schmidt | H04M 1/725 455/553.1 |
| 2005/0146610 A1* | 7/2005 | Creamer | H04N 1/00214 348/207.1 |
| 2008/0278983 A1* | 11/2008 | Park | H02J 7/35 363/95 |
| 2011/0115399 A1* | 5/2011 | Sadwick | H05B 45/385 315/287 |
| 2012/0161527 A1 | 6/2012 | Casey | |
| 2012/0313557 A1* | 12/2012 | Pettey | G08C 13/00 318/16 |
| 2013/0328403 A1 | 12/2013 | Kaufman | |
| 2014/0112041 A1 | 4/2014 | Collin et al. | |
| 2015/0295511 A1 | 10/2015 | Veeraraghavan et al. | |

FOREIGN PATENT DOCUMENTS

| | | |
|---|---|---|
| KR | 101063208 B1 | 9/2011 |
| WO | 2016182931 A1 | 11/2016 |

OTHER PUBLICATIONS

Written Opinion of the International Search Authority in PCT/IB2018/000250 dated Jul. 4, 2018.

Yuan, "Status and Opportunities of Photovoltaic Inverters in Grid-Tied and Micro-Grid Systems" Power Electronics and Motion Control Conference, 2006. IPEMC 2006. CES/IEEE 5th International Aug. 14, 2006.

McClure, "A Modular Architecture for DC-AC Conversion." Department of Electrical Engineering and Computer Science Case Western Reserve University Thesis Paper Jun. 25, 2012.

Sher, "Micro-inverters—Promising solutions in solar photovoltaics." Energy for Sustainable Development 16(4):389-400 Dec. 1, 2012.

Deepa, "Grid-Connected Photovoltaic Power System Using Boost-Half Bridge Converter." IOSR Journal of Electrical and Electronics Engineering 4(5):12-17 Jan. 9, 2012.

Eltawil, "Grid-connected photovoltaic power systems: Technical and potential problem—A review." Renewable and Sustainable Energy Reviews 14(1):112-129 Jan. 1, 2010.

Dumais, "Grid-Connected Solar Microinverter Reference Design." Jan. 1, 2012 http://ww1.microchip.com/downloads/en/AppNotes/01444A.pdf.

York, "An Isolated Micro-Converter for Next-Generation Photovoltaic Infrastructure." Dissertation submitted to the Faculty of the Virginia Polytechnic Institute and State University Mar. 29, 2013.

\* cited by examiner

GENERAL PURPOSE SINGLE CHIP CONTROLLER

CROSS-REFERENCE TO RELATED APPLICATIONS

This application is a continuation-in-part of U.S. patent application Ser. No. 14/058,266, filed Oct. 20, 2013, which claims benefit of U.S. Provisional Patent Application 61/716,583, filed Oct. 21, 2012, the disclosures of each of which are hereby incorporated by reference in their entirety.

FIELD OF THE INVENTION

The present invention relates to a solar micro-inverter and more particularly, to a processing system used in the solar micro-inverter and any other similar system requiring monitoring and control of analog signals as well as communicating to a remote control center.

BACKGROUND OF THE INVENTION

A Conventional strings or central inverter device comprises multiple solar panels that are connected to a centralized inverter system. Solar panels are wired in series, creating a PV array, that is then connected to a string or a central inverter that converts the direct current (DC) from the PV array into an alternating current (AC). However, the performance of these conventional central inverter devices suffer from a number of disadvantages such as sub-optimal energy harvest, safety concern for DC wiring, short life, complex array design and installation, and difficulty in determining the location of performance problems.

On the contrary, a solar micro-inverter is a system that converts direct current (DC) from a single solar panel to an alternating current (AC). The electric power from several micro-inverters is combined and fed into an existing electrical grid. A solar micro-inverter offers various advantages over the conventional strings or central inverter systems. The main advantage is that even small amount of shading, debris or snow line in any one solar panel, or a panel failure do not disproportionately reduce the output of the entire array. Each micro-inverter obtains optimum power by performing maximum power point tracking for its connected panel.

The micro-inverters are located near the panel. The micro-inverters are equipped with a communication unit that enables monitoring the performance of each panel and controlling the micro-inverter for maintenance and troubleshooting purposes. The communication is typically performed using a powerline communication, a cellular modem or a near range wireless modem. The micro-inverter controller is coupled to the powerline communication, a cellular modem or a wireless modem using a suitable interface. The problem associated with this micro-inverter modem arrangement is that it includes redundant processing units optimized for very specific functions such as analog controller, modem and even an additional processor for Arc detection as a safety precaution, ultimately resulting in increased cost.

In light of the foregoing discussion, an improved micro-inverter arrangement is desirable whereby a single processor can implement the modem function as well as the micro-inverter control and any other computational function. Furthermore, a single chip microprocessor is desirable that can perform the communication function as well as analog signal monitoring and controlling functionality. The single chip microprocessor can server the purposed of a general purpose processor or controller that provides communication as well as analog signal control such as voltage and/or current that coincides in one system or application.

SUMMARY

The present invention provides a general purpose single chip controller that imparts controlling, monitoring and communication functionality to a device. The single chip controller comprising: an analog sub-system to receive analog input signals from one or more sensors; a controller sub-system to process the analog input signals and generating instructions for controlling the device; a communication means to establish the connectivity and communication with a remote gateway. The general purpose single chip controller further comprises a module to determine a communication standard for establishing connectivity and communication with the remote gateway. The analog signal may comprise a voltage signal and/or a current signal. The single chip controller can work as a LED controller, a battery charging controller or a motor controller. The one or more sensor measure controlling parameters and sends the data to the general purpose single chip controller, said general purpose single chip controller is programmed to process the data coming from said one or more sensors in order to perform the control and monitoring function and to implement a modem for establishing connectivity with the remote gateway. The communication with the remote gateway comprises wireless standard which may include Bluetooth, Zigbee, IEEE802.15.4, IEEE802.11, 3G, 4G, LTE and the like. The communication means may comprise a wireless modem and/or a powerline communication modem. The controller sub-system also comprises a pulse width modulating controller that supports duty cycle resolution to enable more control over the "smoothness" of the analog signal and reduce sample-to-output delay.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE INVENTION

In the following detailed description of embodiments of the invention, numerous specific details are set forth in order to provide a thorough understanding of the embodiments of the invention. However, it will be obvious to a person skilled in the art that the embodiments of the invention may be practiced without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variation, substitutions and equivalents will be apparent to those skilled in the art without parting from the spirit and scope of the invention.

A solar micro-inverter is a power conversion unit connected to the solar panel for converting direct current (DC) generated by a single solar panel to an alternating current (AC) used by the electric grid. The inverter outputs are relayed to a grid.

The present invention discloses a single-chip grid connected micro-inverter arrangement with a processor to perform both the control and monitoring functions and the communication function, resulting in cheaper, simpler and smaller system implementation. The processor controls and monitors the signals necessary to implement the micro-inverter function and runs the application program associated with the micro-inverter. The processor also implements a catalogue of communication methods using a modem and a networking protocol for establishing connectivity to the smart grid and/or to the Internet cloud. The processor has sufficient programmability to implement any common power line communication (PLC) and near-range wireless standard as well as performing maximum power point tracking and fault detection algorithm. Communication with the smart grid or the Internet cloud is typically performed using a low power line communication modem and/or a near-range low power wireless modem. These communication methods are implemented via a catalogue of low power-line communication standards including PRIME, G3, IEEE 1901.2 and Lon and/or via a catalogue of low power wireless communication standards that includes IEEE802.15.4.

A preferred method for this invention has been described in details in the following paragraphs.

The solar micro-inverter utilizes a single control/communication chip for control and monitoring functions of the power conversion function. Additionally, the performance of the solar array can be monitored remotely or through the Internet cloud using different communication methods and standards as mentioned above. The same methods can be used to control the array remotely, such as shutting the power off in case of emergency or in a faulty panel. The communication methods that are used need to be of low power in order to preserve the power efficiency of the panel.

Figure 1:
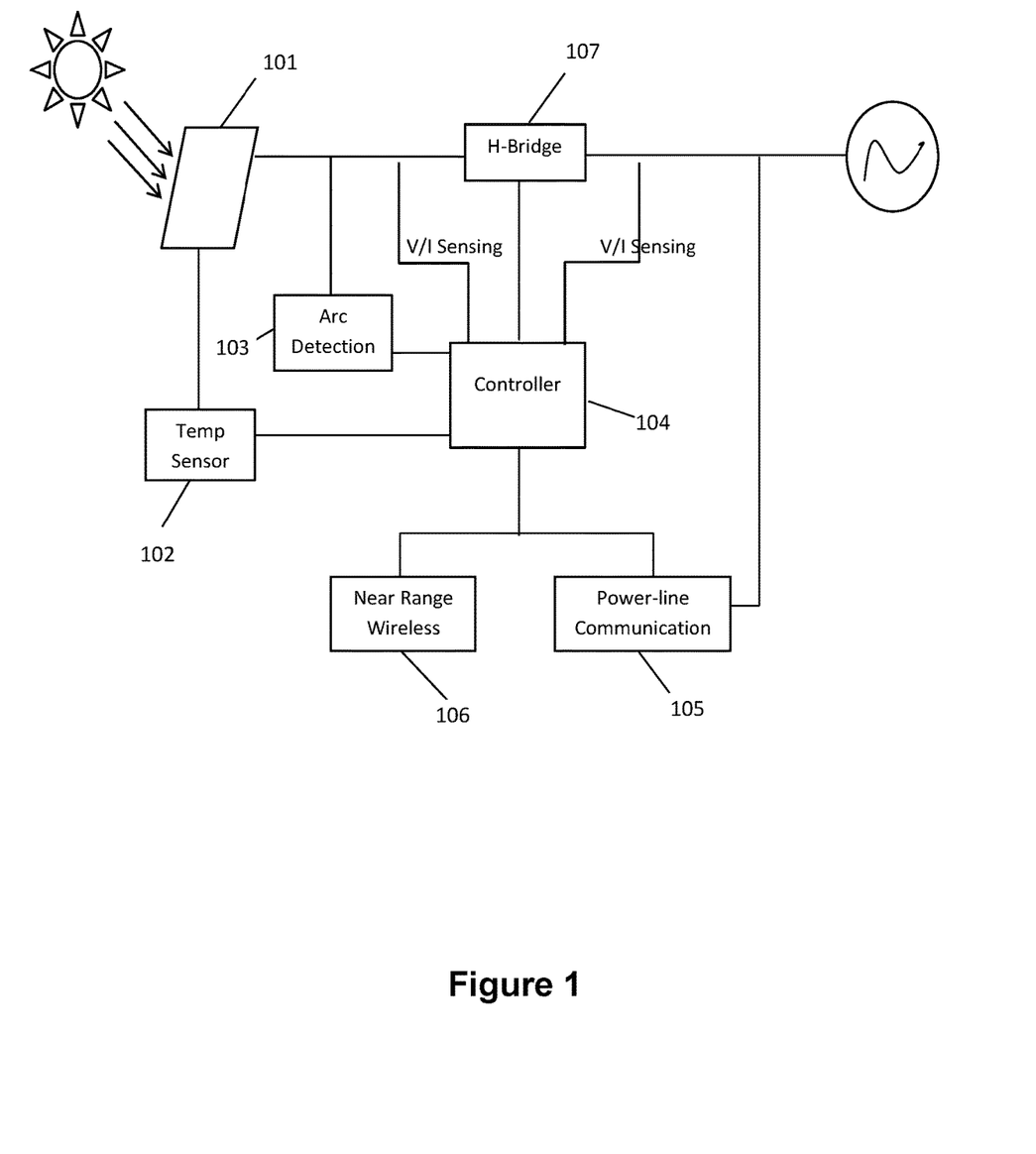
FIG. 1 is a schematic arrangement showing the conventional solar micro-inverter existing in the prior art.

FIG. 1 is a schematic arrangement showing the conventional solar micro-inverter existing in the prior art. Referring to FIG. 1, the arrangement consists of a solar panel/PV panel 101, a plurality of detectors such as a temperature sensor 102, an arc detector 103, and a controller 104 connected to a grid or the internet cloud via a powerline communication or near range wireless modem through an interface. The temperature sensor 102 and the arc detector 103 are coupled to the controller 104 and they transmit their input to the controller 104. A H-bridge circuit 107 is used to convert the DC signal outputted by the PV panel 101 to high frequency AC waveform.

The micro-inverter arrangement as shown in FIG. 1 requires a plurality of processors. The controller 104 monitors the performance of each panel and controls the functioning of the micro-inverter. In order to keep the installation simple and to avoid additional wiring, the communication is typically performed using a power line communication (PLC) 105 or near range wireless modem 106. While communication function is inherent to a micro-inverter based installation, it further increases the cost of the equipment.

The control functions of the micro-inverter are typically performed by the controller 104 with analog control functions, such as fast PWM, running maximum power point tracking algorithms and monitoring the voltage and the current and essentially implementing the micro-inverter applications. The controller 104 can be programmed so as to communicate with a remote data aggregator of some sort to make the monitored data available remotely and even accept remote control commands. This is accomplished by coupling the controller 104 to a power-line 105 or wireless modem 106 via a suitable interface. The controller 104 may be programmed to exchange information with the modem, which in turn converts the information into a suitable format for transmission to the remote source via a power line communication 105 or wireless transmission 106.

The problem with the micro-inverter modem arrangement as shown in FIG. 1 is that it includes redundant processing units optimized for very specific functions, such as an analog controller, a modem and even an additional processor for Arc detection as a safety precaution, ultimately resulting in increased cost.

Figure 2:
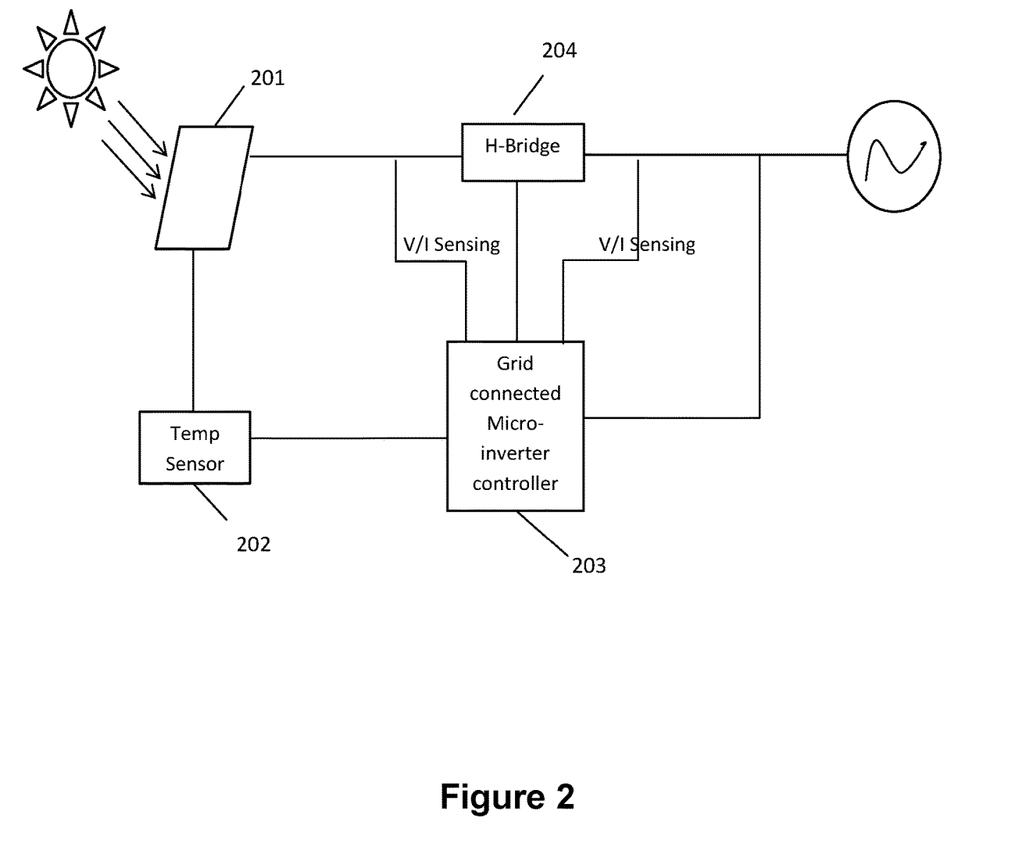
FIG. 2 is a schematic arrangement of a grid connected micro-inverter, in accordance with an embodiment of the present invention.

FIG. 2 is a schematic arrangement of a grid connected micro-inverter in accordance with an embodiment of the present invention. The detector such as a temperature sensor 202 provides input to a controller 203 having a processor for processing the information received by the controller 203. The arrangement in the FIG. 2 is a uniform platform that is independent of the specific modem being used or specific signal control and maximum power point tracking algorithm. The control functions of the micro-inverter are performed by the programmable controller 203 with analog control functions namely PWM and by running maximum power point tracking algorithms and monitoring the voltage and the current and essentially implementing the micro-inverter applications. The controller 203 also performs other auxiliary functions such as monitoring the micro-inverter functioning using a plurality of sensors such as a temperature sensor 202 and an arc detector 103. The voltage and the current in the arrangement are further monitored by the controller 203 that implements the micro-inverter application via embedded analog to digital converters (ADC's). The controller 203 performs the functions of controlling and monitoring the micro-inverter and for maintaining communication with the grid or the Internet cloud or remote location using the standard communication standard. The controller 203 is having an in-built modem that functions as an interface for communication with the grid or a remote location.

An H-Bridge circuit 207 is used to invert DC signals outputted by the photovoltaic cell 201 to a high frequency AC voltage.

The software running on the controller 203 not only includes all the algorithms necessary for micro-inverter application, but also determines the specific means of communication standard being used to exchange information with the remote location or the Internet cloud from a catalogue of communication standards or proprietary schemes. The communication standards include any common power line communication and a near-range wireless communication. Since the micro-inverter application and the modem share the same processor, the data read by the sensors is fed directly to the modem and the control commands received by the modem go directly to the application without the need for any inter-processor communication link as in the traditional implementations. That simplifies the system and makes communications faster, which is especially important in time critical fault scenarios.

In an aspect of the present invention, the micro-inverter arrangement is having only a single processor that performs the control and monitoring functions as well as enabling communication with a remote server using powerline communication or near range wireless modem.

Figure 3:
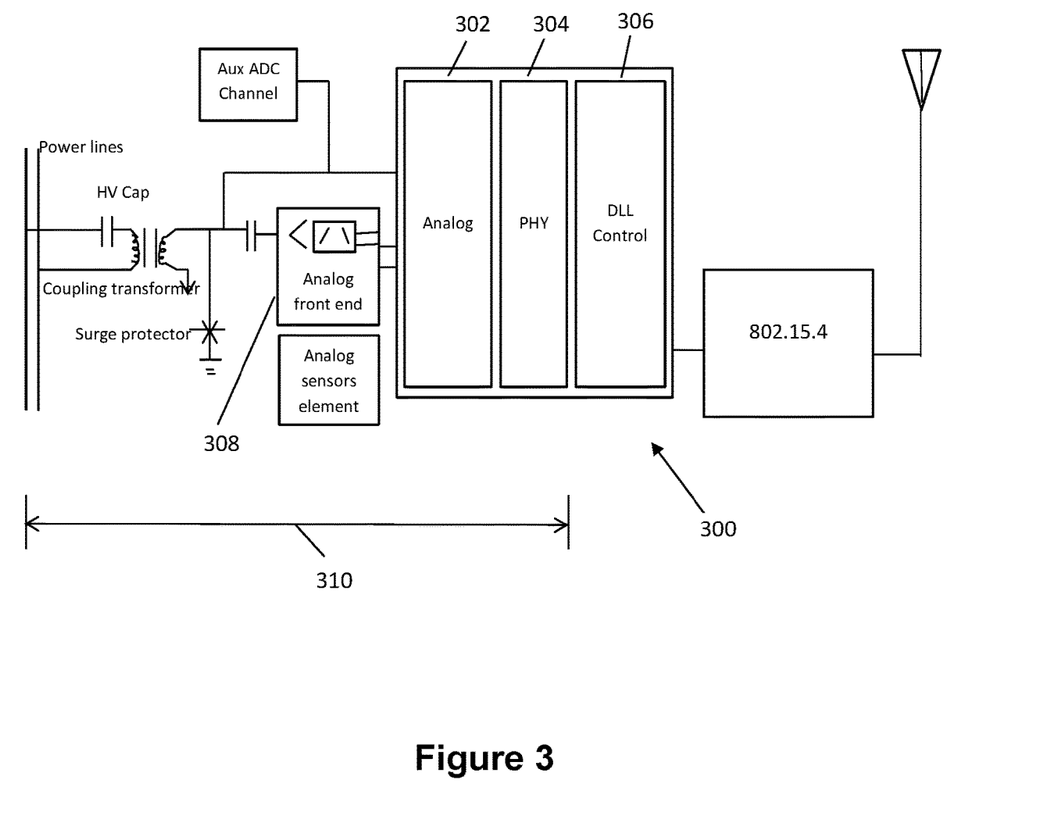
FIG. 3 is a schematic representation of the controller chip used in the solar micro-inverter, in accordance with an embodiment of the present invention.

FIG. 3 is a schematic representation of a controller chip used in the solar micro-inverter, in accordance with an embodiment of the present invention. Referring to FIG. 3, the controller chip 300 is capable of performing multiple algorithmic functions such as an analog monitor, control and communication functions as well as arc detection and the like. The controller chip 300 provides a significantly higher level of integration and thereby makes the design of a micro-inverter simpler and dramatically reduces the cost of implementation, while providing ease of maintenance. The resulting micro-inverter/PV panel combination can communicate directly with "Grid-based" communication using any one of a number of worldwide PLC or wireless standards, thereby being "Grid-tied" both in power delivery and power asset management.

The controller chip 300 executes precise algorithms that are required to keep the solar panel used in a micro-inverter arrangement at the maximum power extraction point while adjusting the DC-DC and DC-AC conversion to produce the output AC voltage for the grid. The controller chip 300 is also programmed to perform the control loops necessary for all the power management functions. The PV maximum output power is dependent on the operating conditions and varies from moment to moment due to temperature, shading, cloud cover, and time of day so tracking and adjusting for this maximum power point is a continuous process. The controller chip 300 contains advanced peripherals like high precision PWM outputs and ADCs for implementing control loops. The ADC measures variables, such as the PV output voltage and current, and then adjusts the DC/DC converter and DC/AC inverter by changing the PWM duty cycle depending on the load. Complex schemes exist to track the true maximum even in partially-shaded PV modules. Real time processors designed to read the ADC and adjust the PWM within a single clock cycle. Other peripherals include fast comparators to detect fault condition and allow for fast reaction, such as shutting off the power to the panel. Communication capability is also included, so users and utilities can monitor the converter, report on power and operating conditions and provide firmware updates.

In an aspect of the present invention, powerline communication or wireless communication, such as Bluetooth, Zigbee, IEEE802.15.4, NB-IoT are used as networking options.

The controller chip 300 comprises an analog sensor unit 302 for sensors and converting the analog data to digital data, a PHY unit 304 for processing the digital data, and a data link layer controller 306 for controlling the functioning of the micro-inverter. The arc detection circuit for the micro-inverter comprises an analog front end 308, an analog-to-digital converter in analog sensor unit 302 and digital signal processor (DSP) in PHY unit 304. The analog front end 308 is a current transformer that measures the current in the string of panels. It acts as a bandpass filter across the range of frequencies to be observed and adds gain to the signal before it is sampled by the analog-to-digital converter and passed to the digital signal processor for further processing. These high-frequency signals are being fed into a comparator and checked against an operator-programmed sensitivity level selected during the test setup. If this level is exceeded, an interrupt signal is then fed into the CPU that shuts down the system.

The controller chip 300 employs a communication unit 310 for communicating with the grid or a remote location using powerline communication standards. Power line communication (PLC) leverages the existing power line infrastructure and provides a cost-effective approach for intelligent monitoring and control to many industrial applications. It makes PLC as one of the leading enabling technologies for smart grid applications ranging from smart metering, lighting control, solar, plug-in electrical vehicle home, building automation of heat and air conditioning, and security and the like. The power line communication system 310 comprises a high voltage capacitor, a coupling transformer, a surge protector, an analog front end, an operational amplifier (op-amp), a programmable gain amplifier, an analog-to-digital converter, a universal asynchronous receiver transmitter, a clock and a micro controller unit.

The powerline communication modem system begins with a modulated signal entering the receiver stage or an active bandpass filter where the op-amp selected for the filter should provide low noise, low harmonic distortion, and low input bias as seen in FIG. 3. Scaling the received signal by using a programmable gain amplifier (PGA) allows for a wide dynamic range and optimal signal processing. The programmable gain amplifier needs to connect to the input of an analog to digital converter (ADC) that is fast and accurate enough to properly convert it to a digital form for processing. The ADC also includes triggering mechanisms for support of multi-frequency and phase sampling. The MCU then enables multiple modulations on the same hardware, thus eliminating the need to redesign the modem to support different modulation or standards. This makes smart and flexible platform for the power line communication implementation. Processed signals are injected back into the power grid by the PLC transmitter stage that drives a high output current. The control can be done using the PWMs support duty cycle resolution to enable more control over harmonics and reduce sample-to-output delay. The op-amp is designed for the rigorous demands of the PLC line driver. The resulting modem can directly communicate with outside systems (both wired and wireless applications) via one of the serial interface options including SPI or UART. The arrangement supports several modulations and standards on one unique design as PRIME and G3 standards.

In another embodiment of the present invention, the micro-inverter is capable of communicating via a catalogue of low power wireless communication standards that include IEEE 802.15.4, IEEE 802.11, NB-IoT and other wireless communications schemes. The communication schemes may include powerline communication modem and/or wireless communication modem to allow both modes of communication by the same MCU.

The controller 300 implements a communication modem for connectivity to the smart grid or to the Internet cloud and performs both the micro-inverter control and modem communication function, resulting in cheaper and smaller system implementation. The analog circuitry handles modulation and demodulation of the signals. Signals from the analog front end are being fed to the phase locked loop and zero crossing detector. The phase locked loop generates an output signal whose phase is related to the phase of an input signal. The zero crossing detector switches the output between +Vsat and −Vsat (Vsat: Saturation voltage almost equal to 14V) when the input from the PLL crosses zero reference voltage. The complex signal is filtered and amplified, and then digitized by the ADCs. All the functions are performed digitally. The digitized data is fed to the DSP block and that data is stored in various memory blocks. In the DLL controller block, a CRC and AES 256 are performed on the digitized data that results into secured and error free data.

A JTAG (Joint Test Action Group) block is used for debugging ports. The JTAG block perform operations like single stepping and break pointing. The processor communicates through a standard SPI bus. The SPI allows full-duplex, synchronous, serial communication between a host processor (the master) and peripheral devices (slaves). The SPI master generates the synchronizing clock and initiates transmissions. SPI slave devices depend on the master to start and synchronize transmissions. The transmission begins when initiated by the SPI master. The data is transferred to the receiver end through PHY and MAC layers.

In another embodiment, the present invention is represented as an integrated grid connected micro-inverter controller. The embodiments comprise a PLC front end, a SM2480 processor and a Zigbee front end that is capable of performing the control, monitor and communication functions simultaneously. The present invention finds application in residential and commercial processes for power delivery and power asset management. The same arrangement is also applicable to LED lighting control, where maximum power point tracking algorithm is replaced with LED controlling algorithm using the same control, monitor and communication components.

The advantages of the present invention are implementation of a smaller solar micro-inverter arrangement for power generation that results in reduced cost. Furthermore, the solar micro-inverter arrangement is more reliable, efficient and is easy to maintain.

In an embodiment of the present invention, the controller chip may find its utilization as a general purpose controller chip in a device which is in communication with a remote device. The controller chip has a single processor that provides controlling and monitoring functionality to the device as well as communication functionality. The controller chip can be embedded in the device that requires reading of analog signal(s) such as voltage, current and other analog signals, wherein the controller chip read the processed signals and generate output signals such as voltage, current or other analog signal while communicating to a remote gateway. The controller chip can be used as a LED controller in a LED lamp, a battery charging controller, a motor controller in an electric motor, and as a monitoring and controlling system.

Figure 4:
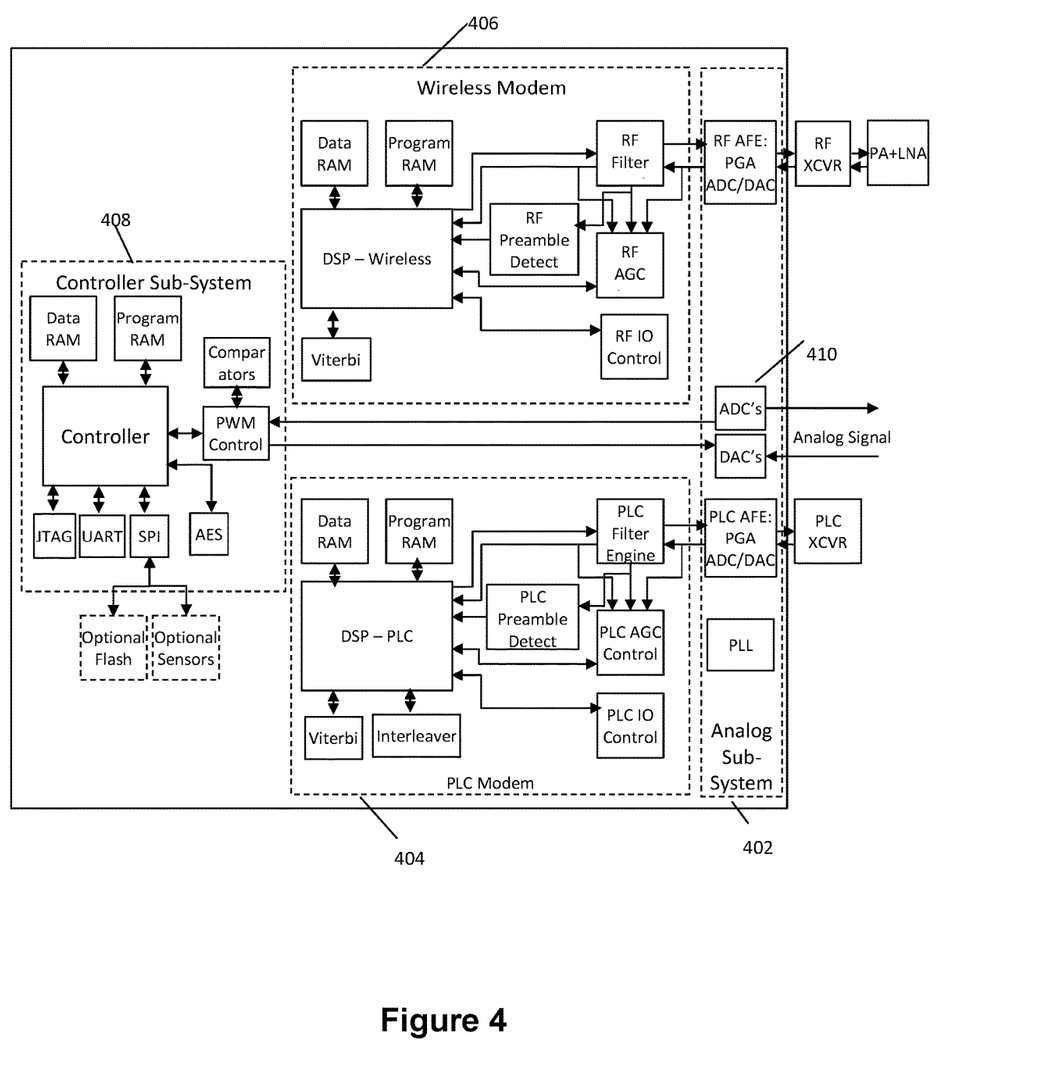
FIG. 4 is a schematic representation of a controller chip with embedded controlling and communication functionality, in accordance with an embodiment of the present invention.

FIG. 4 is a schematic representation of a controller chip used for controlling and monitoring a device and communicating with a remote device, in accordance with an embodiment of the present invention. The controller chip may be implemented as an LED controller, a battery charging controller, a temperature controller for air conditioner, a motor controller and the like. Referring to FIG. 4, the controller chip 400 is capable of performing multiple algorithmic functions such as an analog monitor, control and communication functions as well as arc detection and the like.

The controller chip 400 comprises an analog sub-system 402 for receiving analog data from one or more sensors, and converting the analog data to digital data, a communication means for establishing communication with a remote object; a controller sub-system 408 for processing the signals received from the analog sub-system and for controlling the function of the remote devices configured to the general purpose controller chip. The analog sub-system 402 receives the analog signals in form of voltage and/or current which are fed into an analog to digital converter (ADC) 410. The analog signal is processed by the analog to digital converter and passed to the controller sub-system 408. These high-frequency signals are being fed into a comparator and checked against an operator-programmed sensitivity level selected during the test setup. If this level is exceeded, an interrupt signal is then fed into the CPU that shuts down the system.

The digitized data from the ADC of the analog sub-system is fed to the controller sub-system 408 and that data is stored in various memory blocks. The controller unit present in the controller sub-system 408 enables multiple modulations on the same hardware, thus eliminates the need to redesign the modem to support different modulation or standards. Processed signals are injected back into the remote device by the stage that drives a high output current. The control can be done using a PWM (pulse width modulator) control that support duty cycle resolution to enable more control over harmonics and reduce sample-to-output delay. The PWM controller samples the analog signals, (such as current, voltage) received from the analog sub-system and compares it to a reference signal and adjust the duty cycle of its output signal according to a predefined function. The adjustments are controlled by the hardware to allow for very "fast reaction". The higher level control is performed by software algorithms through programming of the PWM controller. The controller can adjust multiple signals simultaneously to enable precise synchronization between voltage and current changes. The controller sub-system can directly communicate with outside systems (both wired and wireless applications) via one of the serial interface options including SPI (Serial Peripheral Interface) or UART (Universal Asynchronous Receiver/Transmitter).

The controller sub-system 408 may comprise a JTAG (Joint Test Action Group) block as debugging ports. The JTAG block perform operations like single stepping and break pointing. The DLL controller may also comprise an AES 256 (Advanced Encryption Standard) that results into secured and error free data. The controller sub-system 408 communicates through a standard SPI bus. The SPI allows full-duplex, synchronous, serial communication between a host processor and peripheral devices. The data is transferred in the form of voltage and/or current to the receiver end.

The communication means in the controller chip 400 may comprise a wireless modem 406 or a powerline communication modem 404 or a combination thereof. The wireless modem 406 and the PLC modem 404 comprise the components known in the art and may include a transceiver, one or more RAM, a preamble detector, a filter, an I/O control and a digital signal processor among others. The wireless modem and the PLC modem communicate the data received from the controller sub-system 408 to the remote system through the analog sub-system. The analog sub-system may include various optional components that aids in transmitting and receiving signals to and fro between the remote device and the communication means. For example, a programmable gain amplifier in the analog sub-system scales the received analog signal/digital signal that allows a wide dynamic range and optimal signal processing by controlling the gain of the received signal. The analog sensor unit 402 may further comprise a phase locked loop (PLL) that generates an output signal whose phase is related to the phase of the input signal. A digital to analog converter converts the digital signal received from the communication means to analog signal and transmits the analog signal to the remote object.

In an embodiment of the present invention, the controller chip 400 can communicate with the remote device through wireless communication. The wireless communication can be a variant of 802.115.4, a variant of 802.11 or a variant of LTE such as LTE, Cat-M, IoT-NB. The wireless communication means may include but are not limited to wireless personal area network, ZigBee, wireless HART, BLUETOOTH, Thread, wireless LAN network, Wi-Fi, Li-Wi, MiFi, LTE, 3G, 4G, radio communication, LMDS, WiMAX.

In an exemplary embodiment, the controller chip 400 can be used as a motor controller in electric motor. The motor controller may include automatic means for starting and stopping the motor, selecting forward or reverse rotation, selecting and regulating the speed, regulating or limiting the torque, and protecting against overloads and faults. The motor controller receives input from one or more sensors in form of analog signals such as voltage, current or other analog signals. The motor controller then converts the analog signals received from the sensor to digital signal and generates instructions for controlling the electric motor based on the signals received from the sensors. The motor controller has an integrated communication functionality which enables the motor controller to be in communication with one or more remote device. The motor controller can communicate by receiving and sending information from the remote device.

In another exemplary embodiment of the present invention, the controller chip 300 can be used as a LED controller in LED lamp as the LED lamp requires communication and analog signal control, specifically voltage and/or current, coinciding in one system. The LED controller may receive input from one or more sensors, such as ambient light sensor, occupancy sensor, temperature sensors etc. and controls the operation of LED lamp by generating instructions based on the parameters received from one or more sensors. The LED controller can also communicate with a remote device using embedded communication functionality.

The LED controller functions through LED drivers. The LED drivers are usually switching mode devices that convert an input voltage (Typically 120-220 VAC or 12 VDC) into a voltage at which the current drawn by the LED Lamp is equal to its drive current. The LED drivers convert higher voltage, alternating current to low voltage, direct current. They also keep the voltage and current flowing through an LED circuit at its rated level. The drive current is regulated for optimum brightness, LED service life, and battery life. Many LED applications require dimming. Two types of dimming are available: analog and PWM. With analog dimming, 50% brightness is achieved by applying 50% of the maximum current to the LED. Drawbacks to this method include LED color shift and the need for an analog control signal, which is not usually readily available. PWM dimming is achieved by applying full current to the LED at a reduced duty cycle. For 50% brightness, full current is applied at a 50% duty cycle. A benefit of the PWM method is that it enables dimming with minimal color shift in the LED output. Dimming LEDs may lengthen the useful life of LEDs, because dimming can reduce operating temperatures inside the light source. LED drivers can also be used to enable color-changing or sequencing. This can be achieved by dimming a mix of colored LEDs in an array to change colors.

In a "smart home" or "smart office" environment the LED lighting or lamp is controlled remotely, thus requires communication function along with dimming and current regulation algorithms performed on the LED controller system.

In another exemplary embodiment of the present invention, the controller chip can be used as a battery charging controller. The battery charging controller limits the rate at which electric current is added to or drawn from batteries. The battery charging controller act as a shunt to prevent overcharging of batteries. The battery charging controller can also communicates information to and fro with a remote device.

The invention claimed is:

1. A general purpose single chip controller for imparting controlling, monitoring and communication functionality to a device, comprising:
    an analog sub-system to receive analog input signals from one or more sensors;
    a controller sub-system to process the analog input signals and generate instruction for controlling the device;
    a communication means to establish connectivity and communication with a remote gateway;
    wherein the controller sub-system comprises a pulse width modulating controller that supports duty cycle resolution to enable more control over smoothness of the analog input signals and reduce sample-to-output delay.

2. The general purpose single chip controller of claim 1, wherein the general purpose single chip controller determines a communication standard for establishing the connectivity and communication with the remote gateway.

3. The general purpose single chip controller of claim 1, wherein the analog input signals are a voltage signal and/or a current signal.

4. The general purpose single chip controller of claim 1, wherein the general purpose single chip controller is a LED controller, a battery charging controller, or a motor controller.

5. The general purpose single chip controller of claim 1, wherein said one or more sensor comprises one or more of a temperature sensor, a current detector, or a voltage detector.

6. The general purpose single chip controller of claim 1, wherein said one or more sensors measure controlling parameters and sends the data to the general purpose single chip controller, said general purpose single chip controller is programmed to process the data coming off the one or more sensors in order to perform the control and monitoring functions and to implement a modem for establishing the connectivity and communication with the remote gateway.

7. The general purpose single chip controller of claim 1, wherein the communication with the remote gateway is made through a wireless modem.

8. The general purpose single chip controller of claim 1, wherein the communication means comprises one or more of a wireless modem or a powerline communication modem.

9. The general purpose single chip controller of claim 7, wherein the communication with the remote gateway comprises wireless standards which include IEEE802.15.4, IEEE802.11, 3G, 4G, or a standard for wireless broadband communication.

* * * * *